Sept. 29, 1959   R. M. JAMISON   2,906,607
POWDER DISSOLVING APPARATUS
Filed June 22, 1956
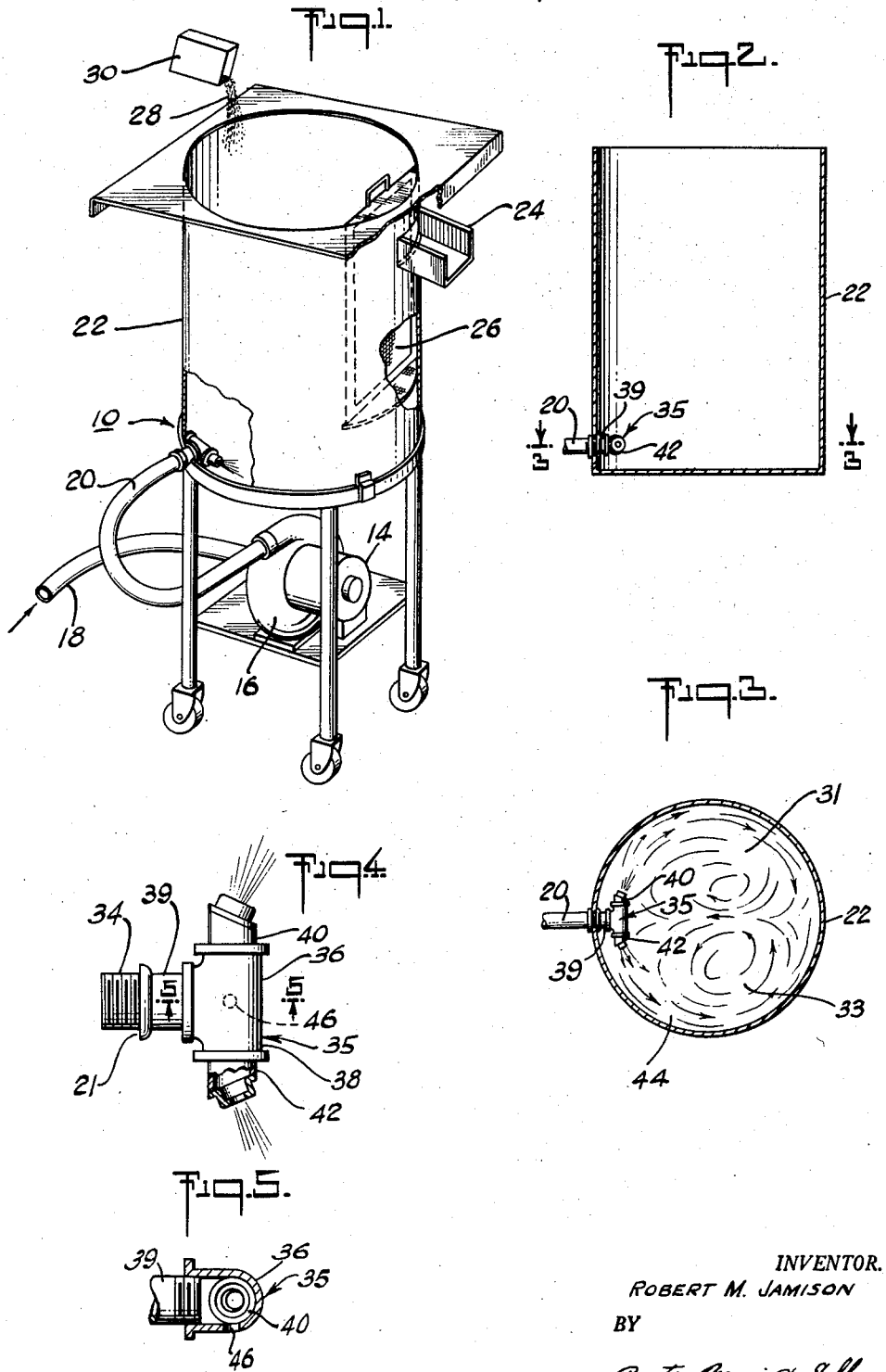
INVENTOR.
ROBERT M. JAMISON
BY
Curtis, Morris & Safford.
ATTORNEYS

United States Patent Office 2,906,607
Patented Sept. 29, 1959

2,906,607

POWDER DISSOLVING APPARATUS

Robert M. Jamison, Detroit, Mich., assignor to Ajem Laboratories, Inc., Livonia, Mich., a corporation of Michigan Application June 22, 1956, Serial No. 593,130

6 Claims. (Cl. 23—271)

This invention relates to improved powder dissolving apparatus and more particularly to mixing tanks incorporating improved liquid diffusing and agitation elements for controlling the agitational effects of influent liquids being injected into reagent powder dissolving apparatus wherein powdered reagents are dissolved in the liquid. The apparatus described and claimed is particularly well adapted for dissolving powdered reagent materials in liquid for use in conjunction with industrial power parts washers, dust collectors and air washers of the wet type, gaseous by-product separators of the wet type and in industrial paint spray booths. This invention is in the nature of a further improvement over the apparatus disclosed in the copending application Serial No. 575,665, filed April 2, 1956, and now abandoned, and assigned to the same assignee as the present application. The illustrative embodiment of my invention disclosed herein is particularly well suited for use in conjunction with the type of apparatus disclosed in said copending application.

Users of industrial power parts washers, dust collectors, and air washers, and the like have for many years been troubled by the severe problems of efficiently and effectively getting powdered reagents into solution in the liquid used. The powdered reagent materials developed for use in such equipment have a relatively high solubility and under proper conditions will dissolve readily. Nevertheless, in many cases the problems encountered in getting them into solution have led industrial users to resort to the use of liquid reagent materials, even though the liquid materials are more expensive, are more difficult to transport and handle, and are usually far less effective than properly and completely dissolved powdered reagent materials.

As explained in said copending application one of the problems often encountered in dissolving powdered reagent materials is the piling up of the powdered material in undissolved mounds on the bottom of mixing tanks. The powder usually falls quickly to the bottom of the bath and piles up in mounds. A jelly like coating rapidly forms over the tops of the mounds of powdered reagent. The insulating qualities of this jelly-like coating prevent the rest of the reagent powder from passing into solution. As a result, the solution generally is too weak to do a good job. Moreover, with the reagent material settling in undissolved mounds, a preferential dissolving of certain components occurs, and the solution becomes unbalanced. For example, where the anti-foam agents are thinned out, troublesome foaming conditions appear, and so forth.

It is an object of my invention to improve powder dissolving apparatus and its operation.

A thorough and rapidly swirling type of agitation of the liquid in the mixing tank and particularly near the bottom effectively prevents the formation of such undissolved mounds of powder and advantageously provides uniform dissolving of all components of the powdered material. Such agitation suspends the powdered material in swirling liquid and provides intimate contact between each powder particle and the liquid, thus yielding a complete dissolving of all components of the material. A concentrated and balanced solution is thus readily obtained.

As an illustrative embodiment of my invention, there is shown a mixing tank incorporating an improved liquid diffusing element which has proven itself extremely effective in producing the desired controlled agitation. This tank and diffusing element are being successfully used in various industrial installations, reducing substantially the amount of labor and expenses formerly entailed in the dissolving of powdered reagents. Among the advantages of the tank incorporating the diffusing element disclosed are those resulting from the fact that a pair of counter revolving swirling masses of liquid are induced in the mixing tank which are strongest near the bottom of the tank and are effective in dissolving powdered reagent materials.

Although in the accompanying drawings I have shown a preferred embodiment of my invention and describe the same in detail and modifications thereof in the specification, it is to be understood that these are not intended to be either exhaustive or limiting of the invention, but on the contrary are chosen for the purpose of illustrating the invention in order that others skilled in the art may so fully understand the invention, its principles and the application thereof, that they may embody it and adopt it in numerous forms, each as may be best suited to the requirements of its particular use.

Figure 1 is a perspective view of a portable mobile powder dissolving unit with the mixing tank being shown partially cut away to disclose the improved liquid diffusing and agitation element incorporated therein;

Figure 2 is a longitudinal sectional view of the mixing tank of Figure 1 incorporating the improved diffusing element shown at the lower left near the bottom of the tank;

Figure 3 is a transverse sectional view taken along the line 3—3 of Figure 2 looking down and illustrating the operation of this improved diffusing element;

Figure 4 is a bottom plan view shown on enlarged scale of the improved diffusing element; and Figure 5 is a sectional view of a branch component taken along the line 5—5 of Figure 4.

Referring in greater detail to Figure 1, there is shown an arrangement wherein the improved diffusing and agitation element 10 is advantageously used in conjunction with portable mobile powder dissolving apparatus. This mobile apparatus includes a chassis frame 12, a motor 14, and a pump assembly 16. An intake hose 18 supplies liquid to the pump and a discharge hose 20 delivers the liquid under substantial pressure to the improved diffusing and agitation element 10. A cylindrical mixing tank 22 is shown with a discharge spout 24 and an effluent filter screen 26 extending down approximately two-thirds of the way along the inside of the tank near the spout 24. In the tank as shown, this screen is ¼ inch mesh.

In order to explain the operation it is assumed that the powder dissolving apparatus is being used to supply solution to a wet-type air cleaner. From time to time as required, powdered reagent material 28 is poured from a container 30 into the open top of the mixing tank. This powdered material is dissolved in the mixing tank by attaching the pump intake hose to a source of liquid, for example, such as the liquid reservoir customarily located in wet-type air cleaners. The liquid is driven by the pump through the hose 20 and is injected into the tank by the element 10 so as to produce an advantageously controlled agitation in the liquid as explained in further detail below. Thus, the powdered reagent material as it is poured into the tank is effectively swirled about in the two counter revolving masses of liquid, each particle being brought into intimate contact with the liquid and rapidly dissolved. Any undissolved chunks or lumps of reagent material are prevented from leaving the tank by the screen 26. The properly balanced solution of reagent components resulting from the desired uniform dissolving of the reagent material is poured from the spout 24 into the supply reservoir of the air cleaner.

The preferred location of the improved diffusing element in a mixing tank is shown in Figures 1, 2 and 3. It will be noted that the element is located near but above the bottom 32 of the mixing tank, thereby providing the greatest swirling effect in the liquid contained in the lower region of the mixing tank. The flow pattern produced in this lower region agitation is highly effective in preventing material being dissolved from piling up on the bottom of said mixing tank and enables a very rapid charging of the apparatus. With this apparatus the powder can be dumped in by the bucketful and nevertheless a complete dissolving of all components of the reagent material is obtained. As shown the centerline of the inlet 20 through the wall of the tank is 1¼ inches above the floor of the tank.

The improved diffusing element is shown in more detail in Figures 4 and 5. The diffusing element is generally T-shaped as seen in plan view. It includes an inlet pipe 34 adapted to be attached to the hose 20 and T-shaped body 35 with a pair of branches 36 and 38 aimed in opposite directions extending out at right angles from a common connection 39 to the inlet pipe. As shown the inlet pipe is a short length of 1 inch standard pipe secured to a 1 inch standard T forming the T-shaped body. A pair of nozzles 40 and 42 are formed at the ends of the branches 36 and 38, respectively, by a pair of short lengths of pipe about 1½ inches long cut off at an angle of approximately 15° at their outer ends. The center line of these branches and nozzles is spaced about 2¼ inches from the adjacent wall of the tank through which the inlet pipe passes. With this 15° angle at each nozzle, they diverge at an inclined angle of 150°. An orifice is formed at the end of each nozzle by a disk welded over the end at this 15° angle and having a hole approximately ⅜ of an inch in diameter. I have found that the angle at the end of the nozzle may be varied somewhat in relation to the diameter of the tank, but it is preferable to have the jet of liquid issue approximately parallel to the direction of a tangent to the wall of the tank adjacent to the end of the nozzle. For example, the mixing tank shown is 15 inches in diameter and about 2 feet high, having a capacity of about 20 gallons, and the nozzle relationship to the tank shown is highly successful in operation. In tanks having a large diameter, such as in a conventional 55 gallon drum, the nozzle angle may be reduced to zero and the orifice size increased up to ½ an inch, so that the nozzles inject the fluid stream substantially straight out from each other, that is, at a divergent angle of a full 180°. In smaller tanks, for example, such as those having a diameter of about 10 inches and a capacity of about 10 gallons, the angle at each nozzle may be increased up to approximately 45° and an orifice size of ⅜ inch is used. In this case the divergent angle between the nozzles is 90°. The size range of the mixing tank from 10 to 55 gallons is satisfactory for all of the various industrial installations which I have encountered with the divergent angle between the nozzles lying in the range from 90° to 180°. For many installations the 20 gallon tank as shown with a nozzle divergence of 150° gives optimum results.

In operation as shown in Figure 3, two counter-revolving masses of liquid are induced in the tank as indicated by the dotted flow lines 44 which follow the path of the liquid. I have found that this pattern is very effective and works to advantage in holding the powder in suspension while providing controlled agitation suitable for accelerating the dissolving rate.

In order to prevent any powder from collecting in the space beneath the diffusing element, a hole 46 is provided in the underside of the central part of the T-shaped body 35. This hole is aimed directly downwardly from the intersection of the axis of the inlet pipe and the two branches 36 and 38 and is 3/16 of an inch in diameter. The resulting agitation of liquid beneath the diffusing element moves any powdered material which may descend into this region out into the two main cylindrical flow patterns revolving in opposite directions. Thus, advantageously there are no "dead spaces" within the mixing tank and any powdered reagent material dumped in the top is quickly and efficiently dissolved.

In order to obtain the optimum results from the use of my invention it is necessary that influent liquid be furnished to the diffusing element at sufficient pressure to insure jetting action by the liquid passing through the openings in the diffusing element. A pressure of at least 10 pounds per square inch is recommended.

In Figure 4 I have shown a gasket seal 21 about the element body at the point where said body passes through the mixing tank wall 54. Said seal provides a watertight fit when pressed and held tightly against the tank wall. If the diffusing element is integrally fitted to the mixing tank the gasket seal may be eliminated.

In the illustrated embodiment of my invented element I have shown the branches 36 and 38 approximately normal to the body. However, my invention is not limited to such an inlet pipe. If desired, these branches may themselves be oriented at angles in the range from 0 to 45° in which case the nozzles themselves are aimed directly out from the ends of these branches.

While I have described in detail the illustrated embodiments of the present invention, one skilled in the art to which my invention appertains, may develop modifications or variations thereof without departing from the spirit and scope of my invention as defined in the following claims.

I claim:

1. Apparatus for producing rapid dissolving of powdered material in a liquid comprising a cylindrical mixing tank having generally upright sides, an inlet pipe extending into said tank and terminating at a common point near the bottom and near one side, a pair of branches directed outwardly from said common point in opposite directions generally parallel with the base of the tank and adjacent to the side of the tank, and a nozzle at the end of each branch, each nozzle being aimed in a direction approximately parallel with a tangent to the side of the tank adjacent to the end of the respective nozzle, said branches having a hole therebetween near said common point aimed downwardly toward the bottom of said tank.

2. Apparatus for producing rapid dissolving of powdered material in a liquid comprising a cylindrical mixing tank having a circular bottom and generally upright sides, a pair of closely spaced nozzles directed outwardly from a common point and aimed in opposite directions diverging at an angle in the range from 90° to 180°, said nozzles being adapted to be fed liquid under pressure, said point being near the bottom of the tank and near the side, said nozzles being aimed in generally opposite directions generally parallel with the base of the tank and generally parallel with tangents to the respective adjacent sides of the tank, whereby the liquid in said tank swirls in two counter-revolving masses forming a figure 8 pattern as seen from above.

3. Apparatus for producing rapid dissolving of powdered material in a liquid comprising a cylindrical mixing tank having a circular bottom and generally upright sides, a pair of closely spaced nozzles directed outwardly from a common point in opposite directions, said nozzles being coupled to a source of liquid under pressure, said common point being closely adjacent to the bottom of the tank and closely adjacent to the side of the tank, said nozzles being aimed in generally opposite directions generally parallel with the base of the tank and generally parallel with tangents to the respective side portions of the tank adjacent thereto, and means directing a jet of fluid downwardly from said common point, whereby the liquid in said tank swirls in two counter-revolving masses forming a figure 8 pattern as seen from above, and said jet means agitates the limited region between and below said nozzles.

4. Apparatus for producing rapid dissolving of powdered material in a liquid comprising a cylindrical mixing tank having generally upright sides and a liquid capacity in the range from about 10 to about 55 gallons, an inlet pipe extending into said tank, a T-shaped diffusing element including a common connection to said pipe near the bottom and near the side, said T-shaped element having a pair of branches directed outwardly from said common connection in opposite directions generally parallel with the base of the tank and generally parallel with the adjacent side of the tank, and a nozzle at the end of each branch, each nozzle being aimed in a direction approximately parallel with a tangent to the side of the tank adjacent to the end of the respective nozzle, each nozzle having an orifice of a size in the range from 3/8 to 1/2 an inch in diameter, said diffusing element having a hole therein at the juncture of said branches and said common connection aimed downwardly, said hole having a diameter of about 1/4 of an inch.

5. Apparatus for producing rapid dissolving of powdered material in a liquid comprising a cylindrical mixing tank having a capacity of about 20 gallons and a circular bottom 15 inches in diameter with generally upright sides, an inlet pipe extending into said tank and terminating at a point near the bottom and near one side, a T-shaped diffusing element including a common connection secured to said inlet pipe and a pair of branches directed outwardly from said common connection in opposite directions generally parallel with the base of the tank and generally parallel with the adjacent side of the tank, a nozzle at the end of each branch each aimed at an angle of about 15° with respect to its branch and in a direction approximately parallel with a tangent to the side of the tank adjacent to the end of the respective nozzle, said nozzles having orifices of about 3/8 inch in diameter, and a connection to said inlet pipe supplying liquid thereto at a pressure of at least 10 pounds per square inch.

6. Apparatus for producing rapid dissolving of powdered material in a liquid, said apparatus comprising a cylindrical mixing tank having a generally circular bottom and generally upright sides and an overflow outlet near the top of said tank, a pair of closely spaced nozzles adjacent to said upright side and within the bottom region of said tank, said nozzles directed outwardly in generally opposite directions from a common point and generally parallel with tangents to each respective side of a tank adjacent each nozzle, a body member connecting said nozzles and connected to a source of liquid supply, said body member having an opening in the lower portion thereof whereby a stream of liquid may be jetted into the area immediately below said body member.

References Cited in the file of this patent

UNITED STATES PATENTS

| | | |
|---|---|---|
| 2,387,945 | McDow | Oct. 30, 1945 |
| 2,527,750 | MacFee | Oct. 31, 1950 |
| 2,590,541 | Johnson et al. | Mar. 25, 1952 |
| 2,603,460 | Kalinske | July 15, 1952 |
| 2,639,981 | Carr | May 26, 1953 |
| 2,683,626 | Wahlin | July 13, 1954 |